Oct. 28, 1941.  J. D. CRECCA ET AL  2,260,969
END WELDING DEVICE
Filed Sept. 4, 1940   3 Sheets-Sheet 1

INVENTORS
J. D. CRECCA, S. S. SCOTT AND
A. M. CANDY.
BY W. Glenn Jones
ATTORNEY

Oct. 28, 1941.  J. D. CRECCA ET AL  2,260,969
END WELDING DEVICE
Filed Sept. 4, 1940  3 Sheets-Sheet 2
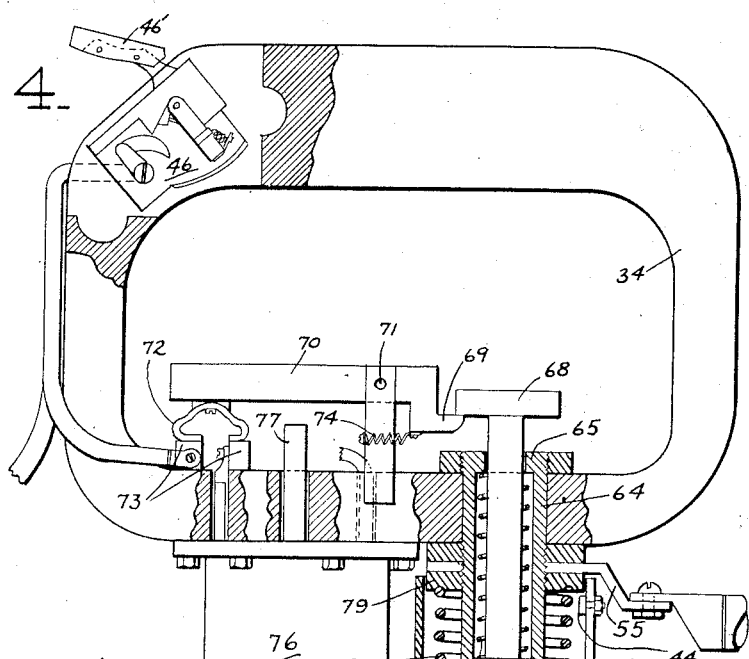
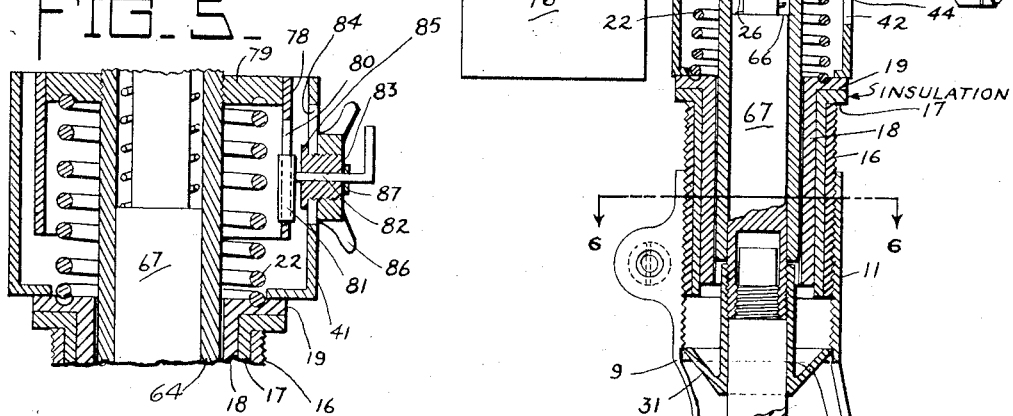
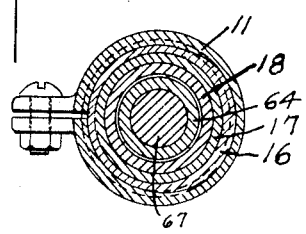
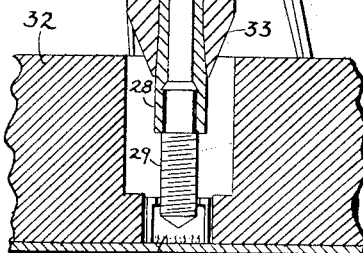
INVENTORS
J. D. CRECCA, S. S. SCOTT AND
A. M. CANDY.
BY Wesley Jones
ATTORNEY Patented Oct. 28, 1941

2,260,969

UNITED STATES PATENT OFFICE 2,260,969

END WELDING DEVICE

John D. Crecca, United States Navy, Samuel S. Scott, St. Albans, N. Y., and Albert M. Candy, La Grange, Ill.

Application September 4, 1940, Serial No. 355,372

14 Claims. (Cl. 219—4)

This invention relates to means for end welding bolts, studs, etc., to metal members such as steel plates.

An object of this invention is to provide means for timing the duration of the welding arc and automatically to move the piece to be welded into weld relation with the member forming the other electrode; a further object is to provide certain operating circuits that are particularly adapted for operating the device as above mentioned.

These and other objects and the manner in which they are accomplished will become apparent from a perusal of the following description in connection with the accompanying drawings wherein:

Fig. 1 is an elevational view, partly in longitudinal section, of one embodiment of our invention;

Figs. 2 and 3 are transverse sections on the lines 2—2 and 3—3 of Fig. 1 respectively;

Fig. 4 is an elevational view, partially in longitudinal section, of another form of our invention;

Fig. 5 is an enlarged detail view of a modified form of the stop for defining the position of the electrode before welding;

Fig. 6 is a transverse section on the line 6—6, Fig. 4; and

The invention herein disclosed embodies certain improvements on the device shown in Letters Patent No. 2,115,707 to present applicants Crecca and Scott. The method to be used therewith is that described in the above mentioned patent wherein the arc is established without conductive contact between the two parts to be welded together, utilizing the arc initiating material covered in Patent No. 2,138,025 to applicants Crecca and Scott.

Figure 1:
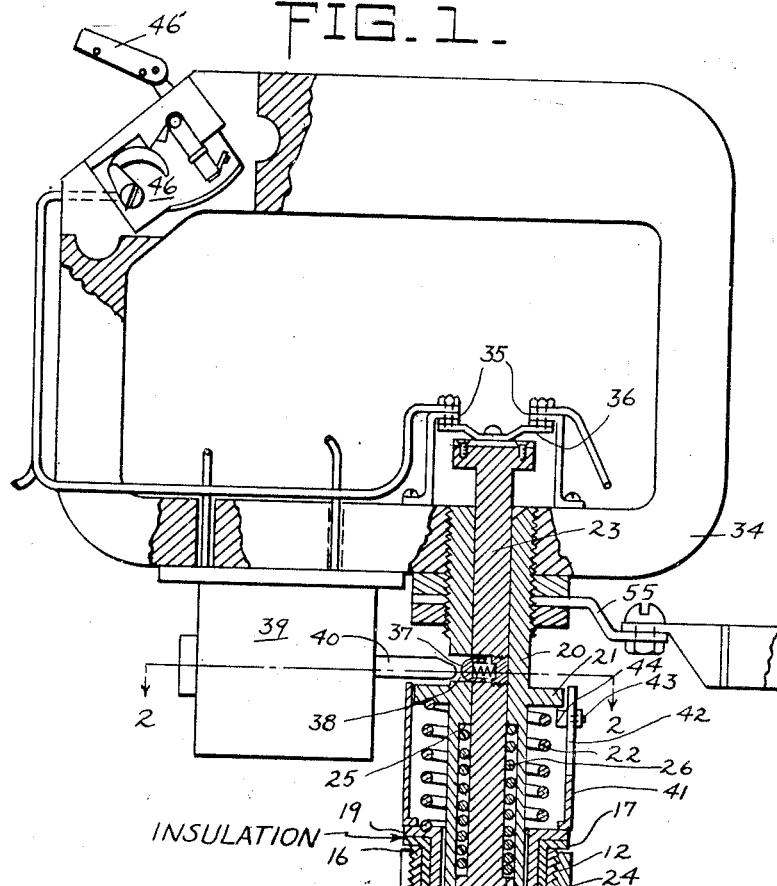
Figure 2:
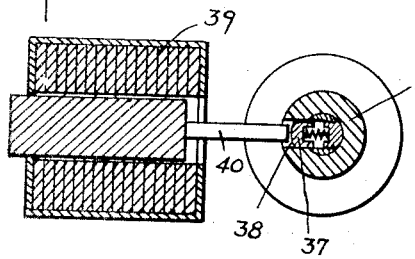
Figure 3:
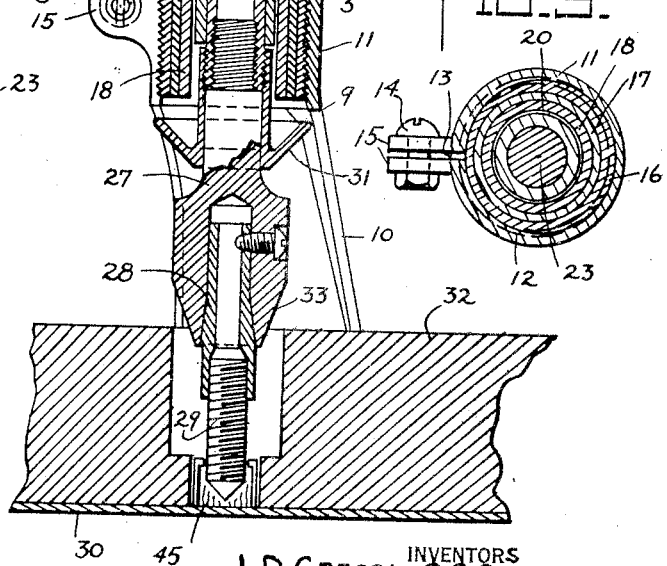

Referring now to Fig. 1, our apparatus comprises a supporting frame 9 having supporting legs 10, preferably three in number and a substantially cylindrical body portion 11 internally threaded as shown at 12 and longitudinally split as shown at 13, the bolt 14 through ears 15 serving to draw the body 11 tightly upon the member threaded therein. Body 11 is split to permit spreading the body to break loose any metal that may, in a molten condition, have splattered upon the threads whereby parts mounted in body 11 are secured therein.

Threaded in body 11 is a bushing 16 and inside the bushing 16 is an insulating member 17 which in turn has disposed in it a metal cylindrical member 18 having a radially extending flange 19.

Slidably mounted in the member 18 is a sleeve 20 having a radially extending flange 21 that serves as one abutment for spring 22 that rests at one end upon flange 19 and normally urges the sleeve 20 away from frame 9. Slidable in sleeve 20 is a plunger 23 having a shoulder 24 facing toward the shoulder 25 in sleeve 20. The spring 26 operates to separate the shoulders 24 and 25 and, when sleeve 20 is held stationary, the plunger 23 may be moved by spring 26 in a direction to effect the weld, as will be hereinafter described.

At one end of plunger 23 is fixed the adapter 27 in which is secured a chuck 28 that carries the stud or bolt 29 to be end welded to plate 30. Preferably, a skirt 31 is provided to prevent spattering of molten metal upon the members carried in body 11 of frame 9 when the plate 30 is in a position other than substantially horizontal and under the feet of the operator. Fig. 1 shows our device being used for end welding studs 29 to deck plate 30 of a ship to secure wooden planking 32 against the deck plate 30 and accordingly adapter 27 is tapered at 33 to aid in centering the stud 29 in the hole in planking 32.

Handle 34 is secured to the end of sleeve 20 remote from frame 9 and is provided with two fixed contacts 35 that are bridged by a conductive bridging member 36 on the adjacent end of plunger 23 when plunger 23 is locked in a predetermined relation with sleeve 20 by engagement of spring pressed detent 37, carried by plunger 23 in the hole 38 in sleeve 20. Mounted on handle 34 is a solenoid 39 having a movable core 40 that is propelled outwardly when solenoid 39 is energized and this disengages detent 37, as will be more fully described in connection with the operation of the device. Secured on flange 19 is a cylindrical member 41 having in it a slot 42 parallel to the axis thereof with a bolt 43 adjustably securing a stop 44 to be engageable by flange 21 on sleeve 20.

Figure 8:
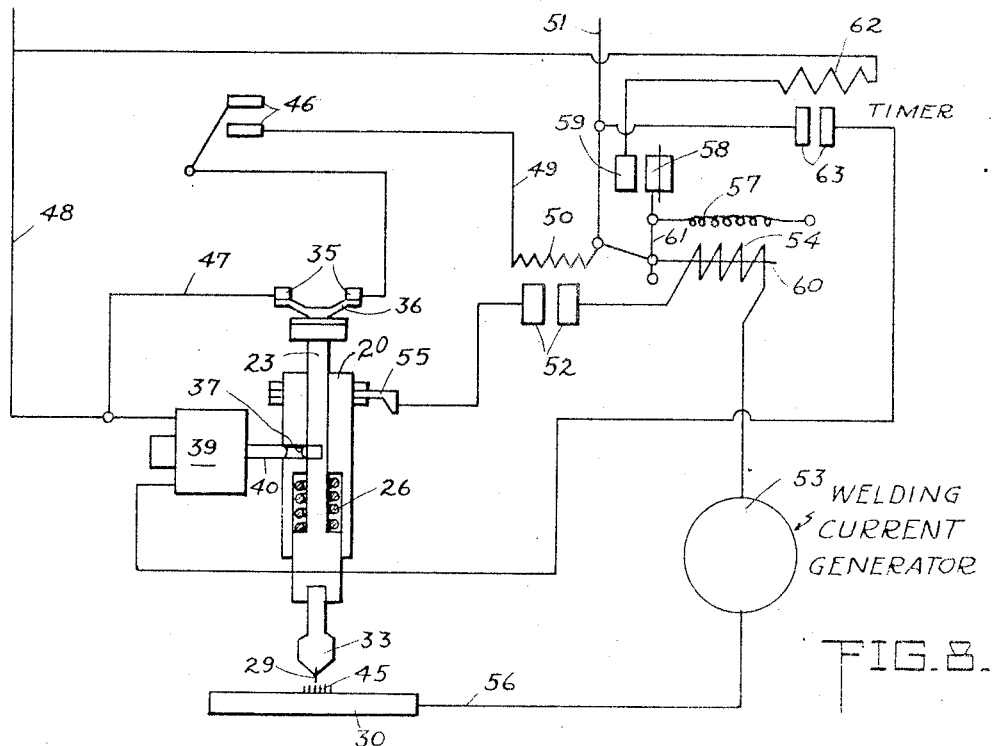

The operation of the device will now be described with reference to Figs. 1 and 8. The stud 29 is pushed into resilient chuck 28 with accompanying compression of spring 26 and movement of plunger 23 in sleeve 20 until bridging member 36 is in circuit closing relation with contacts 35 and detent 37 moves into the hole 38 to hold the plunger 23 in cocked position. Arc initiating material 45 is placed on the situs of the weld or is affixed to the end of stud 29 by some adhesive material, as is described in the above mentioned Patent No. 2,115,707.

Legs 10 of frame 9 are then positioned against planking 32 and handle 34 is moved down until the stud 29 is felt to be in contact with arc initiating material 45, bolt 43 having been previously freed to allow stop 44 to be moved along slot 42 by flange 21. The operator then permits spring 22 to move sleeve 20 upwardly until the free end of stud 29 is at the proper arc length from plate 30 and stop 44 is then adjusted against flange 21, thus fixing the position of sleeve 20 for the series of welding operations.

When ready to make a weld, the operator pushes handle 34 down until flange 21 is against stop 44 and closes switch 46 by pushing on switch lever 46', thus completing the control circuit through contact 35, bridging member 36 and wire 47 to supply lead 48 and also through wire 49 and solenoid 50 to supply lead 51. The energizing of solenoid 50 closes welding circuit contacts 52 and allows current to flow from welding generator 53 through solenoid 54 to sleeve 20 through clip 55 and also to plate 30 through wire 56. Sleeve 20 is electrically connected to plunger 23 through its contact with the plunger and hence the welding circuit is established.

Spring 57 normally holds contact 58 away from contact 59 but when current flows in the welding circuit solenoid 54 is energized and core 60 thereof, which is connected to the stem 61 upon which contact 58 is mounted, closes the circuit through the contacts 58 and 59 and energizes solenoid 62. Solenoid 62 closes the contacts 63 to energize solenoid 39 and move core 40 to disengage detent 37 from sleeve 20 and thus permit spring 26 to thrust the stud 29 into the crater in plate 30. The timing means may be of any type known in the art and the action thereof is delayed for the proper interval to permit the free end of stud 29 and the juxtaposed portion of plate 30 to reach welding temperature.

When plunger 23 is moved by spring 26 to complete the weld, the control circuit is broken at contacts 35 which deenergizes solenoid 50 and permits welding circuit contacts 52 to open, thus shutting off further flow of welding current. Interruption of the welding current deenergizes solenoid 54 which permits spring 57 to separate contacts 58 and 59 and thus the timing circuit is broken. Chuck 28 may then be withdrawn from stud 29 without drawing an arc.

The form of our invention depicted in Fig. 4 is quite similar to that illustrated in Fig. 1 and insofar as the elements in the two figures are the same, they have been given the same reference numeral. However, in Fig. 4 the sleeve 64 has at its upper end an inwardly turned flange 65 that cooperates with a shoulder 66 on plunger 67 in effecting movement of plunger 67 by the spring 26. At the upper end of plunger 67 is an enlarged head 68 that is engageable with a toe 69 on lever 70 pivoted intermediate its ends at 71. Resilient bridging member 72 is insulatingly mounted on lever 70 and is normally in circuit closing relation with control circuit contacts 73, lever 70 being biased to the position shown by spring 74 under compression, or by any other suitable means. Head 68 is of sufficient thickness that toe 69 does not slip above head 68, but remains in contact with the peripheral edge of head 68, even when head 68 is in contact with flange 65. This prevents bridging member 72 from connecting contacts 73 after the weld is completed.

When stud 29 is inserted in chuck 28 plunger 67 is moved upwardly until head 68 passes toe 69 after which the spring 74 restores lever 70 to its normal position.

Figure 7:
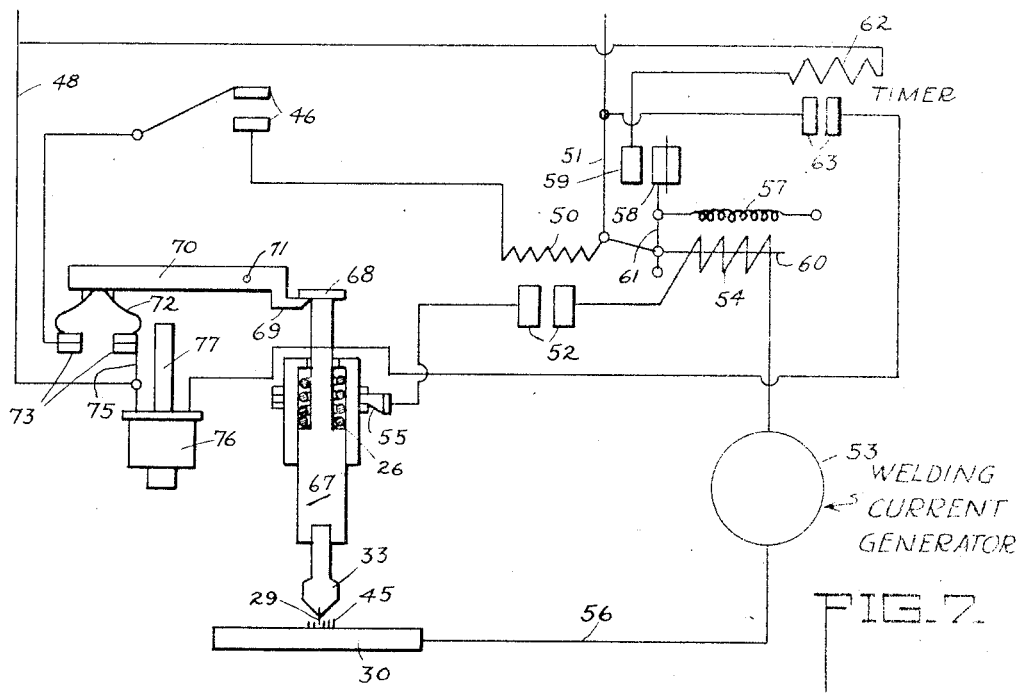
Figs. 7 and 8 are schematic representations of the circuits involved in Figs. 4 and 1, respectively.

Assuming the device to be conditioned for welding operation, closing the switch 46 completes the control circuit through contacts 73, bridging member 72 and wire 75 (Fig. 7) to supply lead 48 and also through solenoid 50 to supply lead 51. Solenoid 50 closes welding contact 52 and the flow of welding current through solenoid 54 effects operation of the timing circuit as above described. Flow of current in the timing circuit energizes solenoid 76 and thrusts core 77 thereof against lever 70 to swing lever 70 on its pivot, thus releasing head 68 of plunger 67 from toe 69 and breaking the control through contacts 73. The plunger 67 is thus freed to be moved by spring 26 and bring stud 29 into welding contact with plate 30.

Instead of the stop 44, we may employ one such as is shown in Fig. 5. It is to be understood that this form of stop is capable of use with either of the above described forms of our welding device. In Fig. 5 we show a tubular member 78 secured to the nut 79 clamped against the clip 55. Member 78 has formed in it a slot 80, closed at both ends, of a length greater than the desired movement of sleeve 64 with respect to the fixed parts of the device. Disposed in slot 80 is an eccentric cam 81 mounted on a shaft 82 that is rotatable in an externally threaded member 83 that is adjustable in slot 84 in member 41. The member 83 is flattened on opposite sides to prevent turning thereof in the slot 84 and has a head 85 that engages the inner surface of member 41 and is drawn into clamping engagement therewith by a wing nut 86 screwed on the member 83.

With the plunger 67 in cocked position as shown in Fig. 4, the wing nut 86 is loosened and with the portion of greatest eccentric throw of cam 81 in position to contact the lower end of slot 80, handle 34 is pushed down until the stud 29 is felt in contact with arc initiating material 45. Wing nut 86 is then set up tight with said portion of maximum throw contacting the lower end of the slot and the cam 81 is rotated to bring its portion of minimum eccentric throw into position to engage the lower end of slot 80 which allows spring 22 to move the sleeve 64 upwardly a distance equal to the proper arc length and thereafter the steps in the welding operation as above described. The length of slot 80 is sufficient to permit moving stud 29 down into contact with material 45, for checking the arc length, even when cam 81 is in the last-mentioned position. When the form of stop shown in Fig. 5 is used in connection with the device illustrated in Fig. 1, the member 78 is fixed to flange 21. Radially inward displacement of cam 81 is prevented by any desired means, such as a collar 87 fixed on shaft 82 to bear against the outer end of member 83.

We claim:

1. A welding device, comprising a frame adapted to rest against a member to which a piece is to be end-welded, spring abutment means carried by said frame, a sleeve slidably mounted in said frame, said sleeve having external spring abutment means and an internal shoulder, a spring around said sleeve between said two abutment means to urge said abutments apart, a plunger slidably mounted in said sleeve and having a shoulder facing the said shoulder in said sleeve, a spring around said plunger under compression between said shoulders, a spring-actuated detent in said plunger engageable with a hole in said sleeve to hold said plunger in predetermined relation to said sleeve, a handle fixed to said sleeve, spaced contacts on said handle adjacent the junction of said sleeve with said handle, bridging conducting means insulatingly mounted on one end of said plunger to connect said contacts when said detent is engaged in said hole, means on the other end of said plunger to hold said piece, a stop carried by said frame engageable by the abutment on said sleeve when said handle is depressed to position said piece at the proper arc distance from said member; a welding circuit connected to supply current to said piece and to said member including closable contacts and a first solenoid; a control circuit including a switch, said spaced contacts, said bridging means, and a second solenoid operable to close the contacts in said welding circuit; a timing circuit including contacts connected to said second solenoid to be closed by said second solenoid when said welding circuit is energized and means to disengage said detent from said sleeve after a time interval sufficient for said piece and the juxtaposed portion of said member to have reached welding heat, whereby to free said plunger to be moved by the spring therearound to bring said piece and said member into welding contact and to break the circuit through the said spaced contacts on said handle.

2. A welding device, comprising a frame adapted to rest against a member to which a piece is to be end-welded, spring abutment means carried by said frame, a sleeve slidably mounted in said frame, said sleeve having external spring abutment means and an internal shoulder, a spring around said sleeve between said two abutment means to urge said abutments apart, a plunger slidably mounted in said sleeve and having a shoulder facing the said shoulder in said sleeve, a spring around said plunger under compression between said shoulders, a handle fixed to said sleeve, spaced contacts mounted on said handle, a lever pivoted intermediate its ends mounted on said handle, bridging conducting means insulatingly mounted on one end of said lever in position to connect said spaced contacts, yieldable means to bias said lever to hold said bridging means against said spaced contacts, a toe on the other end of said lever, an enlarged head on one end of said plunger engageable with said toe to hold said plunger in predetermined relation to said sleeve, means on the other end of said plunger to hold a said piece, a stop carried by said frame engageable by the abutment on said sleeve when said handle is depressed to position said piece at the proper arc distance from said member; a welding circuit connected to supply current to said piece and to said member including closable contacts and a first solenoid; a control circuit including a switch, said spaced contacts, said bridging means and a second solenoid operable to close the contacts in said welding circuit; a timing circuit including contacts connected to said second solenoid to be closed by said second solenoid when said welding circuit is energized and means to rock said lever to release said toe from said enlarged head after a time interval sufficient for said piece and the juxtaposed portion of said member to have reached welding heat, whereby to free said plunger to be moved by the spring therearound to bring said piece and said member into welding contact and to break the circuit through the said spaced contacts.

3. End-welding apparatus, comprising a frame adapted to rest against a member to which a piece is to be end-welded, a sleeve slidably mounted in said frame, a first resilient means to move said sleeve to non-operating position in said frame, a plunger slidably mounted in said sleeve, a second resilient means to move said plunger toward said member, means to lock said plunger in cocked position in said sleeve, circuit-closing elements held in circuit closing position when said plunger is in cocked position, means on the end of said plunger adjacent said member to hold a said piece, a stop carried by said frame to fix the operating position of said sleeve with a said piece at the proper arc distance from said member; a control circuit including said elements and a switch; a welding circuit and means responsive to energization of said control circuit to close said welding circuit; timing means responsive to energization of said welding circuit to release said locking means after a time interval sufficient for said piece and the juxtaposed portion of said member to have reached welding heat and free said plunger to be moved by said second resilient means to bring said piece and said member into welding contact and open said control circuit through said elements.

4. Welding apparatus, comprising a frame adapted to rest against a member to which a piece is to be welded, a sleeve slidably mounted in said frame, a plunger slidably mounted in said sleeve, continuously acting means to urge said sleeve to non-operating position, releasable means to hold said plunger in cocked position in said sleeve; a welding circuit to supply welding current to said piece and said member including means to interrupt said welding circuit; a control circuit including circuit breaking means held in closed position while said plunger is cocked, a switch, and means to close said circuit interrupting means in said welding circuit; stop means to fix the operating position of said sleeve with a said piece carried by said plunger at the proper arc distance from said member, automatic means to release said plunger from cocked position and simultaneously break said control circuit a time interval after closing said welding circuit sufficient for said piece and the juxtaposed portion of said member to have reached welding heat, and means to move said plunger when released to bring said piece and said member into welding contact.

5. An end welding system wherein an arc is initiated without conductive contact of a member and a piece to be end-welded thereto, comprising a supporting frame adapted to rest against said member, a sleeve slidable in said frame, a plunger slidable in said sleeve, means on said plunger to carry a said piece, means to lock said plunger in predetermined relation to said sleeve; means to fix the operating position of said sleeve so that said piece will be at the proper arc distance from said member including an element carried by said sleeve and having in it a slot closed at both ends, an eccentric cam rotatably mounted on said frame and disposed in said slot, means acting on said sleeve to hold in contact with said cam that end of said slot nearest said piece, said cam being so dimensioned that when the portion of maximum eccentric throw contacts the said end of said slot said piece substantially touches said member and when the portion of minimum eccentric throw contacts said end said piece is spaced the proper arc distance from said member, means to supply welding current to said piece and said member, automatic means to unlock said plunger a predetermined time interval after closing of said welding circuit, and means to move said plunger longitudinally, after release of said plunger, to move said piece into welded position.

6. An end-welding system wherein an arc is initiated without conductive contact of a member and a piece to be end-welded thereto, comprising a supporting frame adapted to rest against said member, a sleeve slidable in said frame, a plunger slidable in said sleeve, means on said plunger to carry a said piece, means to lock said plunger in predetermined relation to said sleeve; means to fix the operating position of said sleeve so that said piece will be at the proper arc distance from said member including an element carried by said sleeve and having in it a slot closed at both ends, an eccentric cam rotatably mounted on said frame and disposed in said slot, means acting on said sleeve to hold in contact with said cam that end of said slot nearest said piece, said cam being so dimensioned that when the portion of maximum eccentric throw contacts the said end of said slot said piece substantially touches said member and when the portion of minimum eccentric throw contacts said end said piece is spaced the proper arc distance from said member, and means to effect welding of said piece to said member.

7. An end-welding system wherein an arc is initiated without conductive contact of a member and a piece to be end-welded thereto, comprising a supporting frame adapted to rest against said member, a sleeve slidable in said frame, a plunger slidable in said sleeve, means on said plunger to carry a said piece, means to lock said plunger in predetermined relation to said sleeve; means to fix the operating position of said sleeve so that said piece will be at the proper arc distance from said member including an element carried by said sleeve and having in it a slot closed at both ends, a cam disposed in said slot, said cam being so shaped and dimensioned that in one position of said cam a said piece is substantially in contact with said member and in another position of said cam said piece is spaced the proper arc distance from said member, and means to effect welding of said piece to said member.

8. An end-welding system wherein an arc is initiated without conductive contact of a member and a piece to be end-welded thereto, comprising a supporting frame adapted to rest against said member, an element slidable in said frame, means carried by said element to hold a said piece; means to position a said piece for welding including a cam mounted in said frame and operatively connected to said element, said cam being so shaped and dimensioned that in one position of said cam the said piece is substantially in contact with said member and in another position of said cam said piece is at the proper arc distance from said member, and means to effect welding of said piece to said member.

9. An end-welding system wherein an arc is initiated without conductive contact of a member and a piece to be end-welded thereto, comprising a supporting frame adapted to rest against said member, an element slidable in said frame, means carried by said element to hold a said piece, means fixed on said frame to cooperate with said element and fix the position of said element with said piece at the proper arc distance from said member, circuit means to supply current to said system including a circuit portion carried by said element to be conductively included in said circuit means when said piece is at said arc distance but not so included when said element moves to a different position, and means to effect welding of said piece to said member.

10. End welding apparatus, comprising a frame adapted to rest against a member to which a piece is to be welded, a plunger slidable in said frame; a welding circuit including said member, a said piece, a source of welding current, welding circuit contacts and a solenoid; means to position said plunger initially with a said piece carried thereby at the proper arc distance from said member, a pair of spaced contacts, conducting bridging means carried by said plunger to connect said spaced contacts when said plunger is in said initial position; a control circuit including said spaced contacts and a solenoid connected to close said welding circuit contacts; a timing circuit including closable contacts, a solenoid connected to close said closable contacts, and other contacts connected to be closable by the solenoid in said welding circuit to energize said timing circuit; means operable by current in said timing circuit to release said plunger, and means to move said plunger upon release to bring said piece into welded relation with said member and simultaneously break the circuit through said spaced contacts.

11. End welding apparatus, comprising a frame adapted to rest against a member to which a piece is to be welded, a plunger slidable in said frame; a welding circuit including said member, a said piece, a source of welding current, welding circuit contacts and a solenoid; means to position said plunger initially with a said piece carried thereby at the proper arc distance from said member including an element engageable with said plunger, conducting bridging means carried by said element; a welding circuit including said member, a said piece, welding circuit contacts, and a solenoid; a control circuit including spaced contacts connectible by said bridging means and a solenoid connected to close said welding circuit contacts; a timing circuit including closable contacts, a solenoid connected to close said closable contacts, and other contacts connected to be closable by the solenoid in said welding circuit to energize said timing circuit, whereby to release said plunger from said element and simultaneously break the circuit through said spaced contacts, and means to urge said plunger to bring said piece into welded relation with said member upon release of said plunger.

12. End welding apparatus, comprising a frame adapted to rest against a member to which a piece is to be welded, a plunger slidable in said frame; a welding circuit including said member, a said piece, a source of welding current, welding circuit contacts and a solenoid; means to position said plunger initially with a said piece carried thereby at the proper arc distance from said member, a pair of spaced contacts, conducting bridging means disposed to close the circuit through said spaced contacts when said plunger is in said initial position; a welding circuit including said member, a said piece, welding circuit contacts, and a solenoid; a control circuit including said spaced contacts and a solenoid connected to close said welding circuit contacts; a timing circuit including closable contacts, a solenoid connected to close said closable contacts, and other contacts connected to be closable by the solenoid in said welding circuit to energize said timing circuit, whereby to release said plunger from said element and simultaneously break the circuit through said spaced contacts, and means to urge said plunger to bring said piece into welded relation with said member upon release of said plunger.

13. An end-welding device, comprising a movable plunger adapted to carry a piece to be end-welded, means to hold said plunger in cocked position, circuit-closing means associated with said plunger to be held in closed-circuit position when said plunger is in cocked position, means including said circuit closing means operable to connect said plunger to a welding current source and after a predetermined time to release said plunger from cocked position and break the circuit through said circuit closing means, and means to move said plunger to welding position when released.

14. An end-welding system wherein an arc is initiated without conductive contact of a member and a piece to be end-welded thereto, comprising a supporting frame adapted to rest against said member, an element slidable in said frame, means carried by said element to hold a said piece, means fixed on said frame to cooperate with said element and fix the position of said element with said piece at the proper arc distance from said member, a welding circuit to supply welding current to said piece and said member, a control circuit to control the flow of welding current including a circuit portion carried by said element to be conductively included in said control circuit when said piece is at said arc distance but not so included when said piece is moved to welding position, and means to effect movement of said piece to said welding position.

JOHN D. CRECCA.
SAMUEL S. SCOTT.
ALBERT M. CANDY.